(12) United States Patent
Takahashi

(10) Patent No.: US 10,237,435 B2
(45) Date of Patent: Mar. 19, 2019

(54) ELECTRONIC DEVICE THAT ENSURES REDUCED DATA TRANSFER PERIOD AND RECORDING MEDIUM

(71) Applicant: Kyocera Document Solutions Inc., Osaka (JP)

(72) Inventor: Minoru Takahashi, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/885,724

(22) Filed: Jan. 31, 2018

(65) Prior Publication Data

US 2018/0278783 A1    Sep. 27, 2018

(30) Foreign Application Priority Data

Mar. 23, 2017 (JP) ................. 2017-057531

(51) Int. Cl.
*H04N 1/04* (2006.01)
*H04N 1/00* (2006.01)
*H04N 1/21* (2006.01)

(52) U.S. Cl.
CPC ..... *H04N 1/00928* (2013.01); *H04N 1/00342* (2013.01); *H04N 1/2158* (2013.01); *H04N 2201/0094* (2013.01)

(58) Field of Classification Search
CPC .......... H04N 1/00928; H04N 1/00342; H04N 1/2158
USPC ....................................... 358/1.15
See application file for complete search history.

(56) References Cited

U.S. PATENT DOCUMENTS 9,098,259 B1 * 8/2015 Lachwani ................ G06F 1/26

FOREIGN PATENT DOCUMENTS

JP    2014-078191 A    5/2014

* cited by examiner

*Primary Examiner* — Houshang Safaipour
(74) *Attorney, Agent, or Firm* — HEA Law PLLC

(57) ABSTRACT

An electronic device includes a specific-type data storage device, a startup-mode determining unit, and a device startup unit. The specific-type data storage device ensures storing specific type of data. The startup-mode determining unit determines a startup mode of the electronic device. The device startup unit starts up the electronic device in the startup mode determined by the startup-mode determining unit. The startup mode includes an ordinary startup mode and a data-transfer startup mode that transfers the specific type of data to the specific-type-data storage device. The data-transfer startup mode is a mode where among the processes executed in the ordinary startup mode, at least a part of the processes unnecessary for transferring the specific type of data to the specific-type-data storage device is unexecuted.

6 Claims, 10 Drawing Sheets

| MFP is started up by specific operation | Specific-data storage device is mounted to MFP | ... |
|---|---|---|
| A 1 | A 2 | ... |

| B 1 | B 2 | . . . |
|---|---|---|
| MFP is started up by specific operation | Specific-type data is stored in storage unit | . . . |

| Data-Transfer-Startup Promotion Condition | Data-Transfer-Startup Obstruction Condition | Priority Condition |
|---|---|---|
| | | Data-Transfer-Startup Obstruction Condition |
| A 2 | B 1 | Data-Transfer-Startup Promotion Condition |
| A 1 | B 2 | . . . |
| . . . | . . . | |

| Priority Level | Condition |
|---|---|
| 1 | B 2 |
| 2 | A 1 |
| 3 | B 1 |
| 4 | A 2 |
| ⋮ | ⋮ |

ELECTRONIC DEVICE THAT ENSURES REDUCED DATA TRANSFER PERIOD AND RECORDING MEDIUM

INCORPORATION BY REFERENCE

This application is based upon, and claims the benefit of priority from, corresponding Japanese Patent Application No. 2017-057531, filed in the Japanese Patent Office on Mar. 23, 2017, and the entire contents of which are incorporated herein by reference.

BACKGROUND

Unless otherwise indicated herein, the description in this section is not prior art to the claims in this application and is not admitted to be prior art by inclusion in this section.

As a typical electronic device, there is known an image forming apparatus that includes a storage device that ensures storing specific type of data such as data of an address book of users and data of accounts of users.

In a case such as replacement of an image forming apparatus, specific type of data is transferred to a storage device of the image forming apparatus by an operator, such as a service person of a sales company of the image forming apparatus or a system administrator of a purchaser side of the image forming apparatus.

When specific type of data is transferred to a storage device of an image forming apparatus, first, the image forming apparatus needs to be started up. However, starting up an image forming apparatus includes a startup of various devices and programs that are unnecessary for transferring specific type of data to the storage device, such as a startup of a printer, which is a print device printing an image to a recording medium such as a paper sheet, and a control program of the printer, or a startup of a scanner, which is a reading device reading an image from a document, and a control program of the scanner. Thus, this causes a problem that an operation period for transferring the specific type of data to the storage device becomes longer than necessary by the time of the startup of the various devices and programs that are unnecessary for transferring the specific type of data to the storage device.

Here, as a typical electronic device, there is known a device that determines a startup mode at a startup to start up by the determined startup mode.

SUMMARY

An electronic device according to one aspect of the disclosure includes a specific-type data storage device, a startup-mode determining unit, and a device startup unit. The specific-type data storage device ensures storing specific type of data. The startup-mode determining unit determines a startup mode of the electronic device. The device startup unit starts up the electronic device in the startup mode determined by the startup-mode determining unit. The startup mode includes an ordinary startup mode and a data-transfer startup mode that transfers the specific type of data to the specific-type-data storage device. The data-transfer startup mode is a mode where among the processes executed in the ordinary startup mode, at least a part of the processes unnecessary for transferring the specific type of data to the specific-type-data storage device is unexecuted.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 2 illustrates exemplary data-transfer-startup-promotion-condition information illustrated in FIG. 1.

FIG. 3 illustrates exemplary data-transfer-startup-obstruction-condition information illustrated in FIG. 1.

FIG. 4 illustrates exemplary condition-combination information illustrated in FIG. 1.

DETAILED DESCRIPTION

Figure 1:
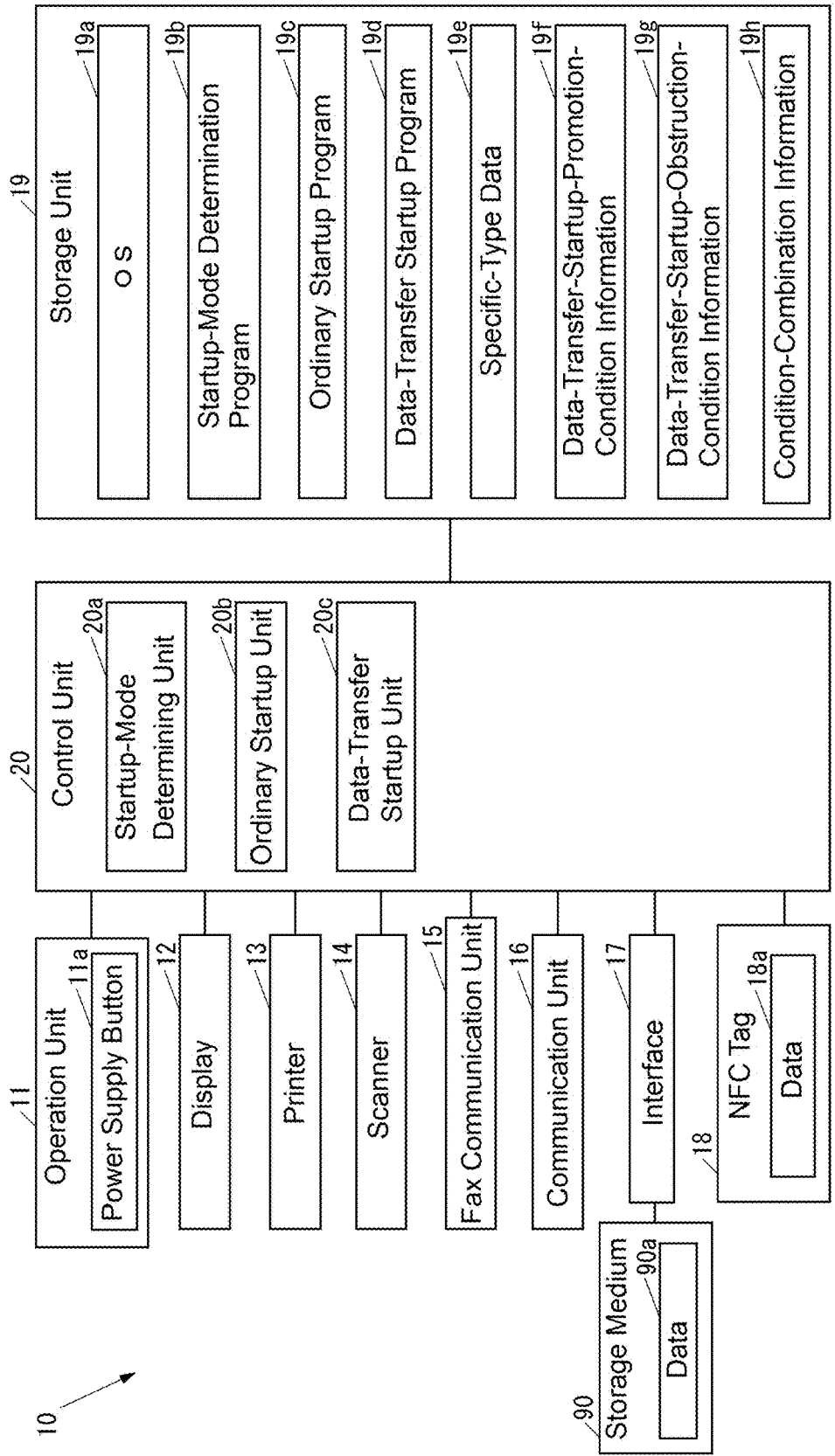
FIG. 1 illustrates a block diagram illustrating an MFP according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the accompanying drawings.

First, a description will be given of a configuration of a multifunction peripheral (MFP) as an electronic device according to the embodiment.

FIG. 1 illustrates a block diagram illustrating an MFP 10 according to the embodiment.

As illustrated in FIG. 1, the MFP 10 includes: an operation unit 11 that is an input device such as buttons with which various kinds of operations are entered; a display 12 that is a display device, such as a liquid crystal display (LCD), that displays various kinds of information; a printer 13 that is a print device that prints an image to a recording medium such as a paper sheet; a scanner 14 that is a reading device that reads an image from a document; a fax communication unit 15 that is a fax device that performs fax communication with an external facsimile device (not illustrated) via a communication line such as a dial-up line; a communication unit 16 that is a communication device that communicates with an external device via a network such as a local area network (LAN) or the Internet, or directly via wired or wireless connection without via the network; an interface 17 to which an external storage medium 90 of the MFP 10, such as a universal serial bus (USB) memory, is connected; a near-field communication (NFC) tag 18 as a storage device that can be read and written even when a power supply of the MFP 10 is disconnected; a storage unit 19 that is a non-volatile storage device such as a semiconductor memory and/or a hard disk drive (HDD) that store various kinds of information; and a control unit 20 that controls the whole MFP 10.

The operation unit 11 includes a power supply button 11a to turn on a power supply to the MFP 10.

The storage medium 90 connected to the interface 17 configures a specific-data storage device of the disclosure only when it stores specific data 90a. Here, the data 90a is data to transfer specific type of data (hereinafter referred to as "specific-type data"), which will be described later, to the storage unit 19, and may be the specific-type data itself.

The NFC tag 18 configures the specific-data storage device of the disclosure only when it stores specific data 18a. Here, the data 18a is data to transfer the specific-type data to the storage unit 19 and may be the specific-type data itself.

The storage unit 19 stores an operating system (OS) 19a. The OS 19a may be installed to the MFP 10 at production stage of the MFP 10, may be additionally installed to the MFP 10 from an external storage medium such as a USB memory, or may be additionally installed to the MFP 10 on a network.

The storage unit 19 stores: a startup-mode determination program 19b to determine a startup mode of the MFP 10; an ordinary startup program 19c to start up the MFP 10 in an ordinary startup mode; and a data-transfer startup program 19d to start up the MFP 10 in a data-transfer startup mode for transferring the specific-type data to the storage unit 19. The startup-mode determination program 19b, the ordinary startup program 19c, and the data-transfer startup program 19d operate on the OS 19a. The startup-mode determination program 19b, the ordinary startup program 19c, and the data-transfer startup program 19d each may be installed to the MFP 10 at production stage of the MFP 10, may be additionally installed to the MFP 10 from an external storage medium such as a USB memory, or may be additionally installed to the MFP 10 on a network. The startup-mode determination program 19b, the ordinary startup program 19c, and the data-transfer startup program 19d may be consolidated as a data-transfer program to transfer the specific-type data to the storage unit 19.

The storage unit 19 ensures storing specific-type data 19e and configures a specific-type data storage device of the disclosure. The specific-type data 19e is, for example, data of an address book of users or data of accounts of users.

The storage unit 19 stores data-transfer-startup-promotion-condition information 19f that indicates data-transfer-startup promotion conditions that promote to determine the startup mode as the data-transfer startup mode.

FIG. 2 illustrates an exemplary data-transfer-startup-promotion-condition information 19f.

For example, as illustrated in FIG. 2, in the data-transfer-startup-promotion-condition information 19f, there exist: a condition (hereinafter referred to as "a condition A1") that the MFP 10 is started up by a first operation; and a condition (hereinafter referred to as "a condition A2") that the NFC tag 18 and the storage medium 90 as the specific-data storage device are mounted to the MFP 10. In the embodiment, assume that the data-transfer-startup promotion conditions are satisfied when the condition A1 or the condition A2 is satisfied, or when both of them are satisfied, namely, when at least one of them is satisfied.

As the first operation in the condition A1, for example, there is an operation that a specific button of the operation unit 11 other than the power supply button 11a is pressed at a time point when the power supply button 11a is pressed when the MFP 10 is not started up.

The specific-data storage device in the condition A2 is determined to store specific data when, for example, it stores data of a specific file name.

As illustrated in FIG. 1, the storage unit 19 stores data-transfer-startup-obstruction-condition information 19g that indicates data-transfer-startup obstruction conditions that obstruct to determine the startup mode as the data-transfer startup mode.

FIG. 3 illustrates an exemplary data-transfer-startup-obstruction-condition information 19g.

For example, as illustrated in FIG. 3, in the data-transfer-startup-obstruction-condition information 19g, there exist: a condition (hereinafter referred to as "a condition B1") that the MFP 10 is started up by a second operation; and a condition (hereinafter referred to as "a condition B2") that the specific-type data 19e is stored in the storage unit 19. In the embodiment, assume that the data-transfer-startup obstruction conditions are satisfied when the condition B1 or the condition B2 is satisfied, or when both of them are satisfied, namely, when at least one of them is satisfied.

As the second operation in the condition B1, for example, there is an operation that a specific button of the operation unit 11 other than the power supply button 11a is pressed at a time point when the power supply button 11a is pressed when the MFP 10 is not started up. In the embodiment, assume that the second operation in the condition B1 is different from the first operation in the condition A1. Specifically, for example, the specific button pressed as the second operation in the condition B1 is different from the specific button pressed as the first operation in the condition A1.

As a determination method of existence of the specific-type data 19e in the condition B2, for example, when a configuration in which if the specific-type data 19e does not exist, an empty file for the specific-type data 19e also does not exist is that of the MFP 10, there is a method in which it is determined that the specific-type data 19e exists when existence of a file for the specific-type data 19e is confirmed based on a file name. When a configuration in which even if the specific-type data 19e does not exist, an empty file for the specific-type data 19e exist is that of the MFP 10, there is a method in which it is determined that the specific-type data 19e exists when a file size of the file for the specific-type data 19e exceeds a specific size (for example, 0 byte). When a configuration in which a specific flag is set when the specific-type data 19e is stored is that of the MFP 10, there is a method in which it is determined that the specific-type data 19e exists when the flag is set.

As illustrated in FIG. 1, the storage unit 19 stores condition-combination information 19h that indicates which of the data-transfer-startup promotion conditions and the data-transfer-startup obstruction conditions is prioritized when it satisfies both of a specific condition among the data-transfer-startup promotion conditions and a specific condition among the data-transfer-startup obstruction conditions.

FIG. 4 illustrates an exemplary condition-combination information 19h.

For example, the condition-combination information 19h illustrated in FIG. 4 includes the information that even when the condition A2 among the data-transfer-startup promotion conditions is satisfied, the data-transfer-startup obstruction condition is prioritized when the condition B1 among the data-transfer-startup obstruction conditions is satisfied, namely, the ordinary startup mode is determined instead of the data-transfer startup mode as the startup mode. The condition-combination information 19h illustrated in FIG. 4 includes the information that even when the condition B2 among the data-transfer-startup obstruction conditions is satisfied, the data-transfer-startup promotion condition is prioritized when the condition A1 among the data-transfer-startup promotion conditions is satisfied, namely, the data-transfer startup mode is determined instead of the ordinary startup mode as the startup mode.

The control unit 20 illustrated in FIG. 1 includes, for example, a central processing unit (CPU), a read-only memory (ROM) that stores programs and various kinds of data, and a random-access memory (RAM) that is used as a work area of the CPU. The CPU executes the programs stored in the ROM or the storage unit 19.

The control unit 20 ensures a startup-mode determining unit 20a that determines the startup mode of the MFP 10 by executing the startup-mode determination program 19b. The control unit 20 ensures an ordinary startup unit 20b that starts up the MFP 10 in the ordinary startup mode by executing the ordinary startup program 19c. The control unit 20 ensures a data-transfer startup unit 20c that starts up the MFP 10 in the data-transfer startup mode by executing the data-transfer startup program 19d. The ordinary startup unit 20b and the data-transfer startup unit 20c configure a device startup unit that starts up the MFP 10 in the startup mode determined by the startup-mode determining unit 20a.

Next, a description will be given of operations at a startup of the MFP 10.

Figure 5:
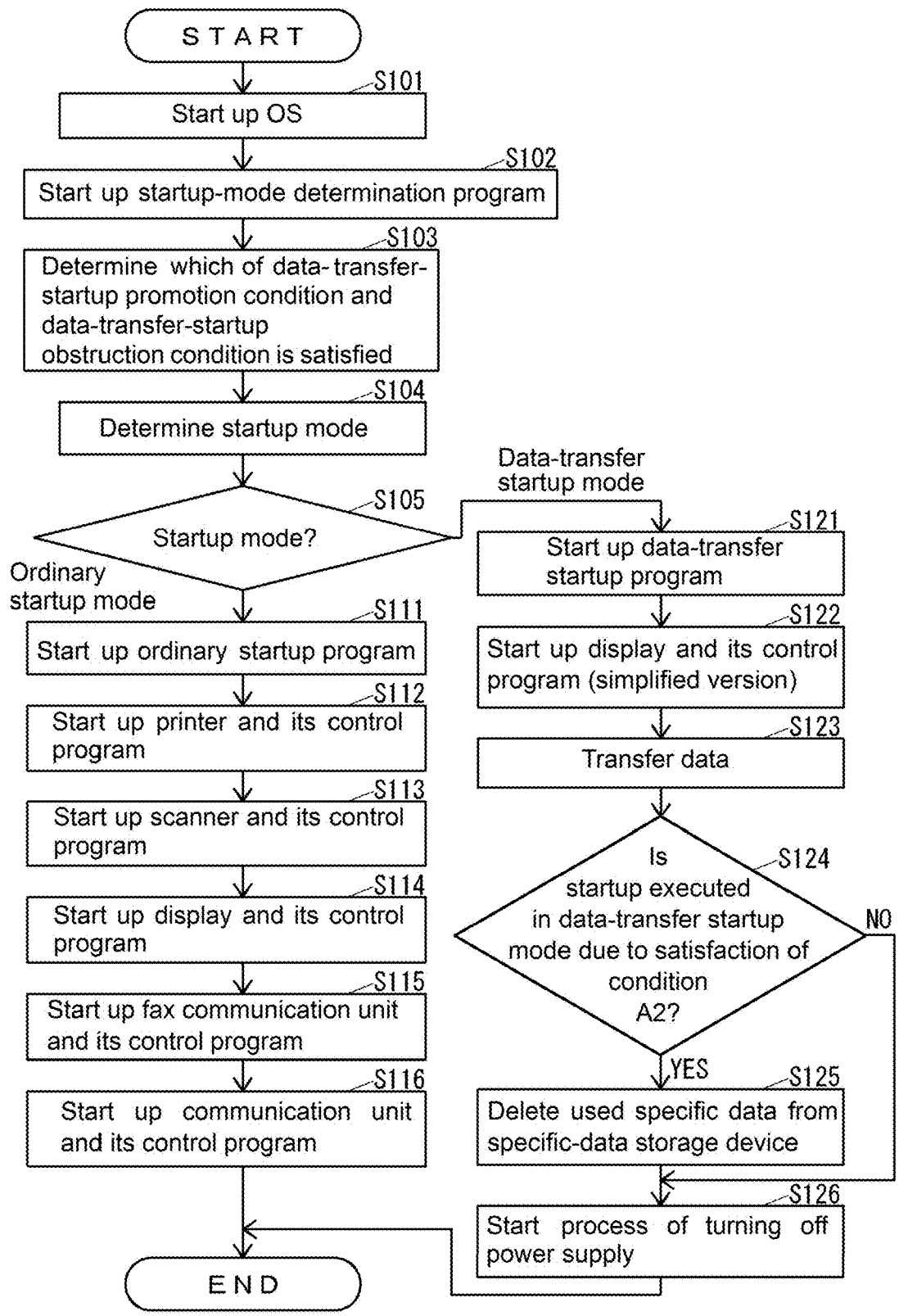
FIG. 5 illustrates operations at a startup of the MFP according to the one embodiment.

Pressing the power supply button 11a causes the MFP 10 to execute the operations illustrated in FIG. 5, after an electric power is supplied to the storage unit 19 and the control unit 20.

FIG. 5 illustrates the operations at startup of the MFP 10.

As illustrated in FIG. 5, after starting up the OS 19a (Step S101), the control unit 20 starts up the startup-mode determination program 19b (Step S102).

Subsequently, the startup-mode determining unit 20a determines which of the data-transfer-startup promotion conditions and the data-transfer-startup obstruction conditions is satisfied based on the data-transfer-startup-promotion-condition information 19f and the data-transfer-startup-obstruction-condition information 19g (Step S103).

Subsequently, the startup-mode determining unit 20a determines any of the ordinary startup mode and the data-transfer startup mode as the startup mode based on a determination result at Step S103 and the condition-combination information 19h (Step S104).

When neither the data-transfer-startup promotion conditions nor the data-transfer-startup obstruction conditions is determined to be satisfied at Step S103, or only the data-transfer-startup obstruction condition of the data-transfer-startup promotion condition and the data-transfer-startup obstruction condition is determined to be satisfied at Step S103, the startup-mode determining unit 20a determines the ordinary startup mode as the startup mode at Step S104. When any of the data-transfer-startup promotion conditions and any of the data-transfer-startup obstruction conditions are determined to be satisfied at Step S103, the startup-mode determining unit 20a determines the ordinary startup mode as the startup mode at Step S104 when the data-transfer-startup obstruction condition is prioritized based on the satisfied condition of the data-transfer-startup promotion conditions, the satisfied condition of the data-transfer-startup obstruction conditions, and the condition-combination information 19h.

When only the data-transfer-startup promotion condition of the data-transfer-startup promotion condition and the data-transfer-startup obstruction condition is determined to be satisfied at Step S103, the startup-mode determining unit 20a determines the data-transfer startup mode as the startup mode at Step S104. When any of the data-transfer-startup promotion conditions and any of the data-transfer-startup obstruction conditions are determined to be satisfied at Step S103, the startup-mode determining unit 20a determines the data-transfer startup mode as the startup mode at Step S104 when the data-transfer-startup promotion condition is prioritized based on the satisfied condition of the data-transfer-startup promotion conditions, the satisfied condition of the data-transfer-startup obstruction conditions, and the condition-combination information 19h.

After the process at Step S104, the startup-mode determining unit 20a determines the startup mode determined at Step S104 (Step S105).

When the startup mode is determined to be the ordinary startup mode at Step S105, the startup-mode determining unit 20a starts up the ordinary startup program 19c (Step S111).

Subsequently, the ordinary startup unit 20b starts up the printer 13 and the control program of the printer 13 (Step S112), starts up the scanner 14 and the control program of the scanner 14 (Step S113), starts up the display 12 and the control program of the display 12 (Step S114), starts up the fax communication unit 15 and the control program of the fax communication unit 15 (Step S115), starts up the communication unit 16 and the control program of the communication unit 16 (Step S116), and terminates the operations illustrated in FIG. 5.

Even when started up in the ordinary startup mode, the MFP 10 can transfer the specific-type data 19e to the storage unit 19 from the NFC tag 18 or the storage medium 90 corresponding to the operation entered from the operation unit 11.

When the data-transfer startup mode is determined to be determined as the startup mode at Step S105, the startup-mode determining unit 20a starts up the data-transfer startup program 19d (Step S121).

Subsequently, the data-transfer startup unit 20c starts up the display 12 and the control program of the display 12 (Step S122).

Here, a display mode of the display 12 in the data-transfer startup mode is simpler than the display mode of the display 12 in the ordinary startup mode. For example, as a screen 30 illustrated in FIG. 6, a screen of the display 12 in the data-transfer startup mode is monochrome and low resolution, can display only a few character types (for example, two-byte katakana, a black square symbol, and a white square symbol), and is not required to be able to display a figure. On the other hand, as a screen 40 illustrated in FIG. 7, the screen of the display 12 in the ordinary startup mode is color and high resolution, can display many character types (for example, a one-byte numeral, a one-byte alphabetical character, one-byte katakana, a two-byte numeral, a two-byte alphabetical character, two-byte katakana, two-byte hiragana, a two-byte Chinese character, and various kinds of symbols), and can display also a figure. Consequently, the control program started up at Step S122 is simple compared with the control program started up at Step S114, and the startup terminates in a short time.

Subsequently, the data-transfer startup unit 20c transfers the specific-type data 19e to the storage unit 19 from the NFC tag 18 or the storage medium 90 (Step S123). That is, the data-transfer startup unit 20c stores the specific-type data 19e to the storage unit 19 based on the data 18a when the data 18a is stored in the NFC tag 18, and stores the specific-type data 19e to the storage unit 19 based on the data 90a when the data 90a is stored in the storage medium 90. In the data-transfer startup unit 20c, when the data 18a is stored in the NFC tag 18 and the data 90a is stored in the storage medium 90, it is preferred that which of the data 18a stored in the NFC tag 18 and the data 90a stored in the storage medium 90 to be based on is set in advance for storing the specific-type data 19e to the storage unit 19.

Figure 6:
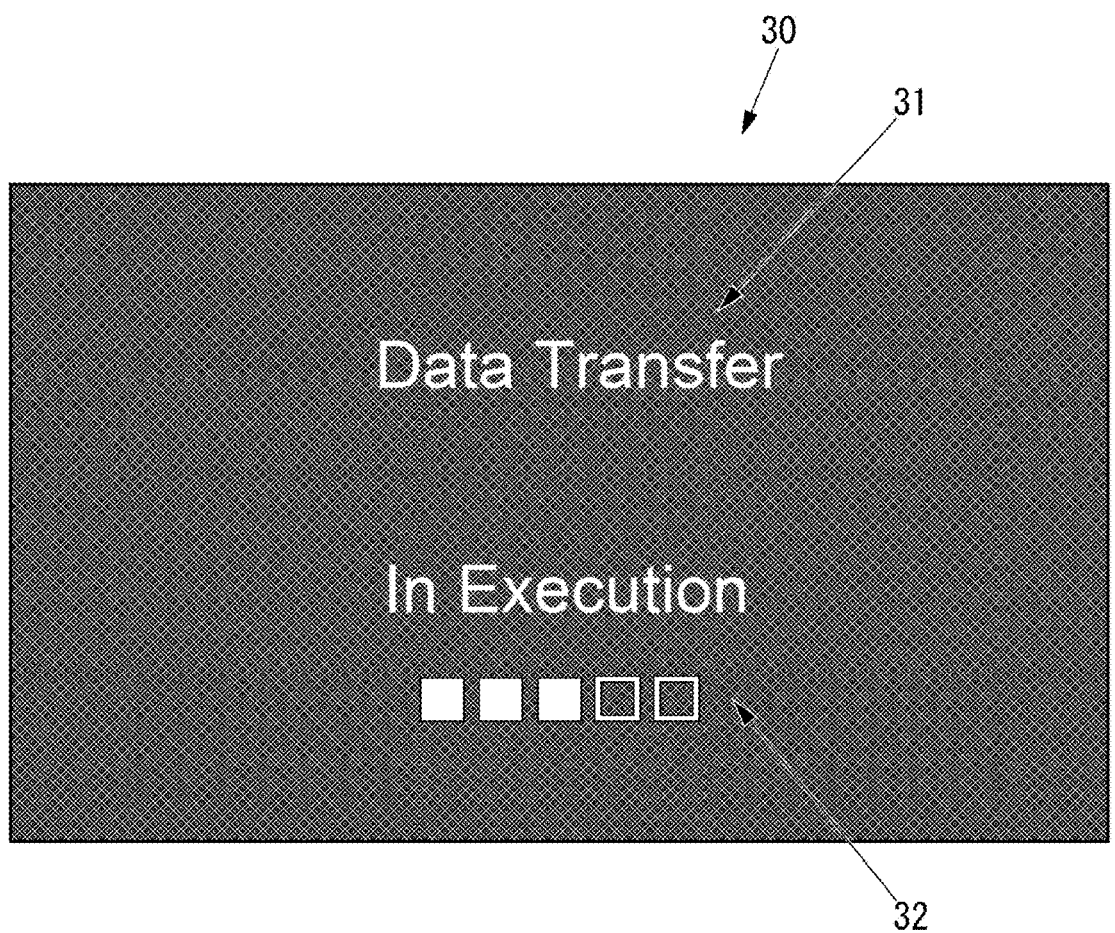
FIG. 6 illustrates an exemplary screen of a display according to the one embodiment, in a data-transfer startup mode.
Figure 7:
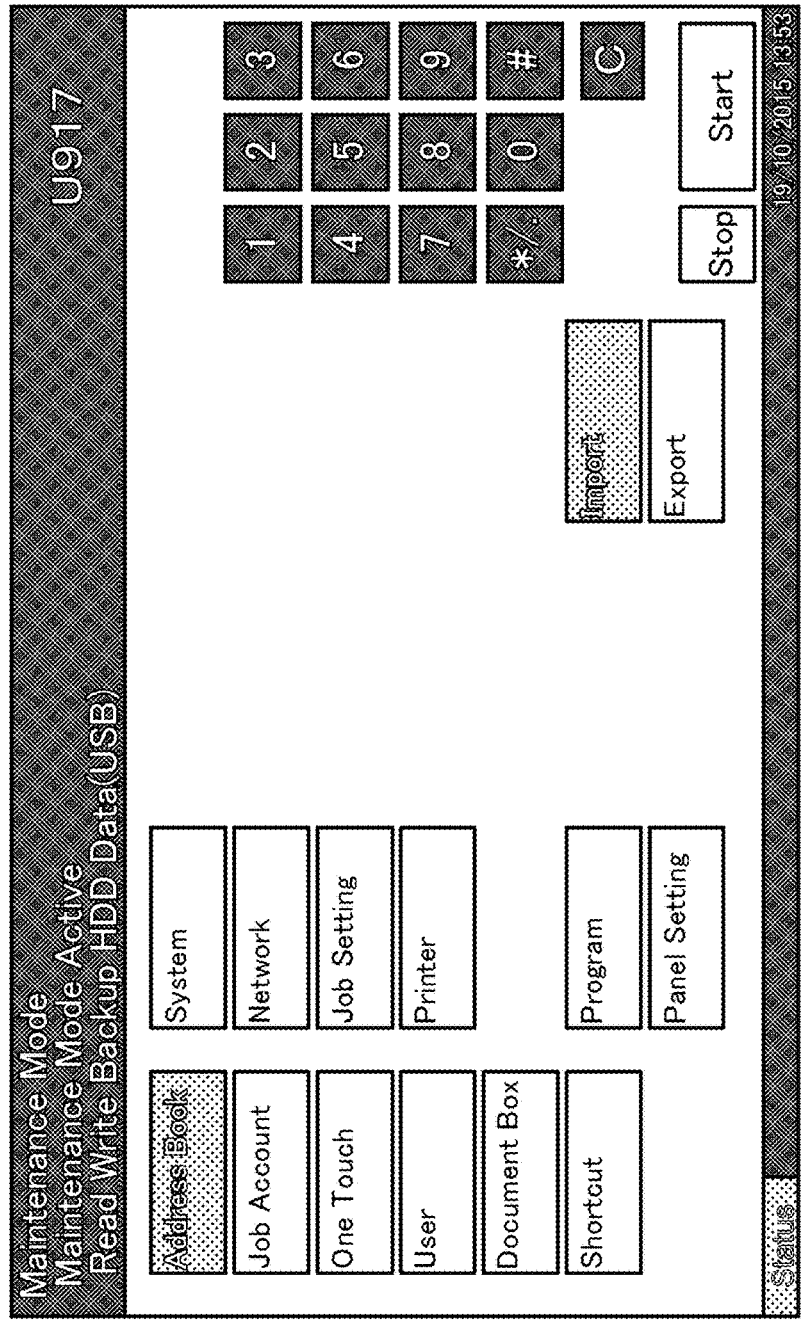
FIG. 7 illustrates an exemplary screen of the display according to the one embodiment, in an ordinary startup mode.

When starting the process at Step S123, the data-transfer startup unit 20c may display the screen 30 illustrated in FIG. 6 on the display 12. The screen 30 includes: a message 31 of "data transfer is in execution" that indicates that the process of transferring the specific-type data 19e to the storage unit 19 is in execution; and a progress bar 32 that indicates a progress status of the process of transferring the specific-type data 19e to the storage unit 19 by the black square symbols and the white square symbols.

After the process at Step S123, the data-transfer startup unit 20c determines whether the startup is executed in the data-transfer startup mode by satisfaction of the condition A2 or not (Step S124).

When the startup is determined to be executed in the data-transfer startup mode by satisfaction of the condition A2 at Step S124, the data-transfer startup unit 20c deletes the data used for transferring the specific-type data 19e at Step S123 from the specific-data storage device (Step S125). That is, the data-transfer startup unit 20c deletes the data 18a from the NFC tag 18 when the data 18a has been used for transferring the specific-type data 19e at Step S123, and deletes the data 90a from the storage medium 90 when the data 90a has been used in transferring the specific-type data 19e at Step S123.

When it is determined that the startup is not executed in the data-transfer startup mode by satisfaction of the condition A2 at Step S124, or terminating the process at Step S125, the data-transfer startup unit 20c starts the process of turning off the power supply (Step S126) to terminate the operations illustrated in FIG. 5.

Figure 8:
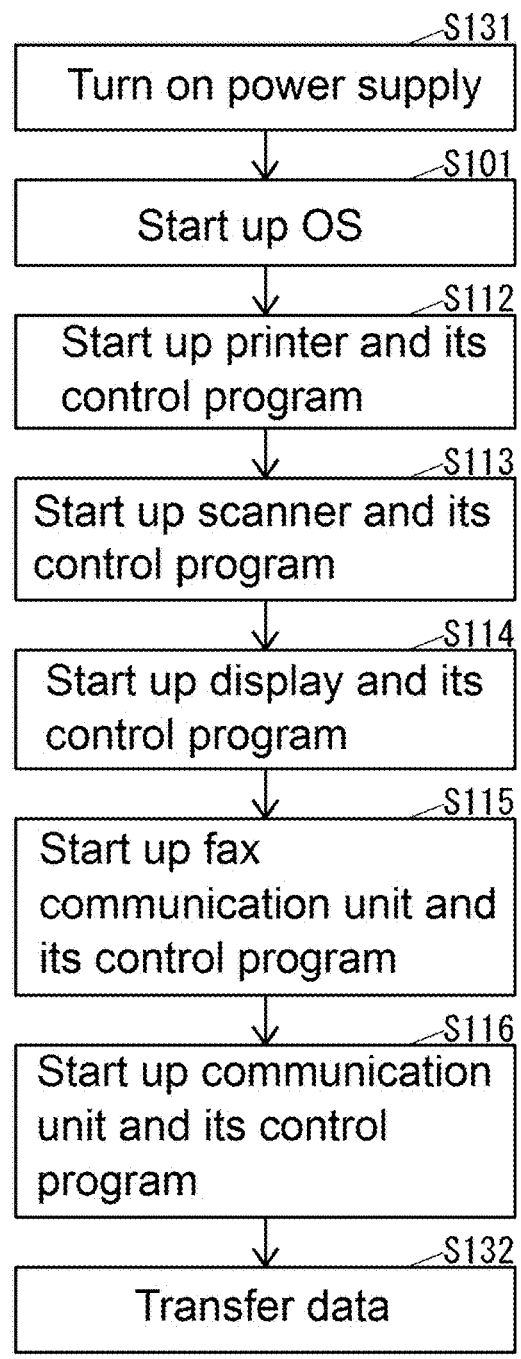
FIG. 8 illustrates a flow of main processes of the MFP according to the one embodiment when specific-type data is transferred to a storage unit in a case of a startup in the ordinary startup mode.
Figure 9:
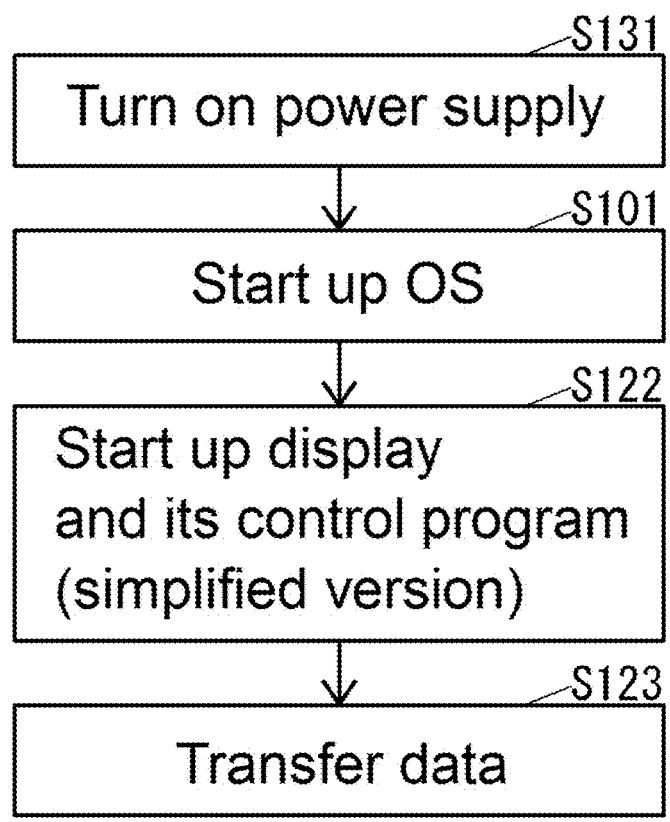
FIG. 9 illustrates a flow of main processes of the MFP according to the one embodiment in a case of a startup in a data-transfer startup mode.

FIG. 8 illustrates a flow of a main processes of the MFP 10 when the specific-type data 19e is transferred to the storage unit 19 in a case of the startup in the ordinary startup mode. FIG. 9 illustrates a flow of the main processes of the MFP 10 in a case of the startup in the data-transfer startup mode.

As illustrated in FIG. 8, when the specific-type data 19e is transferred to the storage unit 19 in the case of the startup in the ordinary startup mode, many processes (Steps S101, S112 to S116) are executed since the turn-on of the power supply by pressing the power supply button 11a (Step S131) until the start of transferring the specific-type data 19e to the storage unit 19 (Step S132). On the other hand, as illustrated in FIG. 9, when the startup is executed in the data-transfer startup mode, compared with when the specific-type data 19e is transferred to the storage unit 19 in the case of the startup in the ordinary startup mode, the processes executed since the turn-on of the power supply by pressing the power supply button 11a (Step S131) until the start of transferring the specific-type data 19e to the storage unit 19 (Step S123) are small in number, and thus, the transferring of the specific-type data 19e is promptly executed.

As described above, the MFP 10 can be started up in a short time in the data-transfer startup mode, where at least a part of the processes (Steps S112 to S116) unnecessary to transfer the specific-type data 19e to the storage unit 19 among the processes executed in the ordinary startup mode is not executed, and thus, this ensures reduced operation period for transferring the specific-type data 19e to the storage unit 19.

Transferring of the specific-type data 19e to the storage unit 19 is often executed at introduction of the MFP 10, not at ordinary use of the MFP 10 after introduction of the MFP 10. Consequently, in the data-transfer startup mode, there is no problem even the printer 13, the scanner 14, the fax communication unit 15, and the communication unit 16 cannot be used.

The MFP 10 is started up in the data-transfer startup mode when started up by the first operation (the condition A1) or when the NFC tag 18 or the storage medium 90 as the specific-data storage device is mounted (the condition A2), and thus, this ensures improved convenience. For example, when the MFP 10 is started up in the data-transfer startup mode when the condition A2 is satisfied, an operation to the operation unit 11 by an operator is unnecessary because of the startup in the data-transfer startup mode, and thus, this ensures improved convenience.

The MFP 10 is started up in the ordinary startup mode when started up by the second operation (the condition B1) or when the specific-type data 19e is stored in the storage unit 19 (the condition B2), and thus, this ensures improved convenience. For example, when the MFP 10 is started up in the ordinary startup mode when the condition B2 is satisfied, an operation to the operation unit 11 by an operator is unnecessary because of the startup in the ordinary startup mode, and thus, this ensures improved convenience.

In many cases, transferring of the specific-type data 19e to the storage unit 19 is usually executed first only once, for example, at introduction of the MFP 10. The MFP 10 is started up in the ordinary startup mode instead of being started up in the data-transfer startup mode when the condition B2 is satisfied, and thus, this ensures improved convenience.

The MFP 10 is started up in the ordinary startup mode when the condition B1 among the data-transfer-startup obstruction conditions is satisfied even when the condition A2 among the data-transfer-startup promotion conditions is satisfied, and thus, this ensures prevention of the startup in the data-transfer startup mode when the startup in the data-transfer startup mode is unnecessary even when the specific condition among the data-transfer-startup promotion condition is satisfied. For example, this is convenient when an operator of the MFP 10 wants to use the storage medium 90, where the data 90a is stored, with the MFP 10, for a purpose other than that of transferring the specific-type data 19e to the storage unit 19.

The MFP 10 is started up in the data-transfer startup mode when the condition A1 among the data-transfer-startup promotion conditions is satisfied even when the condition B2 among the data-transfer-startup obstruction conditions is satisfied, and thus, this ensures the startup in the data-transfer startup mode when the startup in the data-transfer startup mode is necessary even when the specific condition among the data-transfer-startup obstruction conditions is satisfied.

When started up in the data-transfer startup mode due to satisfaction of the condition A2 that the NFC tag 18 or the storage medium 90 as the specific-data storage device is mounted (YES at Step S124), the MFP 10 deletes the specific data from the specific-data storage device (Step S125) after having transferred the specific-type data 19e to the storage unit 19 (Step S123), and thus, this ensures prevention of the startup in the data-transfer startup mode at next startup. This configuration particularly has a high effect when the storage device mounted to the MFP 10 as standard, such as the NFC tag 18, becomes the specific-data storage device.

After the process at Step S123, the MFP 10 may execute the process at Step S126 without executing the processes at Steps S124 and S125.

In the MFP 10, a condition other than the conditions described above may be set as the data-transfer-startup promotion conditions. For example, in the MFP 10, as the data-transfer-startup promotion conditions, a condition that the NFC tag 18 and the storage medium 90 as the specific-data storage device are mounted may be set when started up by a specific operation. Here, the specific operation may be the first operation in the condition A1 or may be another operation. Similarly, in the MFP 10, a condition other than the conditions described above may be set as the data-transfer-startup obstruction conditions. For example, in the MFP 10, as the data-transfer-startup obstruction conditions, a condition that the specific-type data 19e is stored in the storage unit 19 may be set when started up by a specific operation. Here, the specific operation may be the second operation in the condition B1, may be another operation, and may be the operation identical to the specific operation in the data-transfer-startup promotion conditions. In this case, when both of the data-transfer-startup promotion condition and the data-transfer-startup obstruction condition are satisfied, the data-transfer-startup obstruction conditions may be prioritized. When both of the data-transfer-startup promotion conditions and the data-transfer-startup obstruction conditions are satisfied, the data-transfer-startup promotion conditions may be prioritized.

In the MFP 10, as the condition-combination information 19h, combination information other than that illustrated in FIG. 4 may be set. For example, in the MFP 10, when the condition B2 among the data-transfer-startup obstruction conditions is satisfied, the data-transfer-startup obstruction condition may be prioritized even when any of the data-transfer-startup promotion conditions is satisfied.

In the MFP 10, when both of the specific condition among the data-transfer-startup promotion conditions and the specific condition among the data-transfer-startup obstruction conditions are satisfied, the startup mode may be determined based on a priority level between the respective conditions among the data-transfer-startup promotion conditions and the respective conditions among the data-transfer-startup obstruction conditions, not based on which of the data-transfer-startup promotion conditions and the data-transfer-startup obstruction conditions is prioritized. That is, instead of the condition-combination information 19h, the MFP 10 may store priority-level information 19i as illustrated in FIG. 10 in the storage unit 19.

Figure 10:
FIG. 10 illustrates exemplary priority-level information stored in the storage unit according to the one embodiment.

For example, when the priority-level information 19i illustrated in FIG. 10 is stored in the storage unit 19, as long as the condition B2 is satisfied, the condition B2 is prioritized even when any of the data-transfer-startup promotion conditions is satisfied, and thus, the MFP 10 is started up in the ordinary startup mode.

In the embodiment, the MFP 10 starts up the display 12 even in the data-transfer startup mode (Step S122). However, in the data-transfer startup mode, the MFP 10 may display that a transferring process of the specific-type data 19e to the storage unit 19 is in execution, or the progress status of the process of transferring the specific-type data 19e to the storage unit 19 by a unit other than the display 12, such as a lamp or similar method, or does not need to display by any unit.

In the embodiment, after the process at Step S122, the MFP 10 automatically starts the process at Step S123. However, after the process at Step S122, the MFP 10 may start the process at Step S123 when a specific operation is entered into the operation unit 11.

In the embodiment, the MFP 10 automatically starts the process at Step S126 when it is determined that it does not mean that the startup has been executed in the data-transfer startup mode by satisfaction of the condition A2 at Step S124, or terminating the process at Step S125. However, the MFP 10 may start the process at Step S126 when a specific operation is entered into the operation unit 11 after determining that it does not mean that the startup has been executed in the data-transfer startup mode by satisfaction of the condition A2 at Step S124, or terminating the process at Step S125.

While the electronic device of the disclosure is an MFP in the embodiment, the electronic device may be an image forming apparatus other than an MFP, such as a printer-only machine or a copy-only machine, or may be an electronic device other than an image forming apparatus, such as a personal computer (PC).

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An electronic device comprising:
a processor, and
a specific-type data storage device that ensures storing specific type of data;
the processor configured to:
determine a startup mode of the electronic device; and
start up the electronic device in the startup mode determined by the processor; wherein
the startup mode includes
an ordinary startup mode, and
a data-transfer startup mode that transfers the specific type of data to the specific-type-data storage device;
the data-transfer startup mode is a mode where among the processes executed in the ordinary startup mode, at least a part of the processes unnecessary to transfer the specific type of data to the specific-type-data storage device is unexecuted;
wherein the processor determines the ordinary startup mode as the startup mode when a data-transfer-startup obstruction condition that obstructs determining the data-transfer startup mode as the startup mode is satisfied;
wherein the processor determines the ordinary startup mode as the startup mode when a specific condition among the data-transfer-startup obstruction conditions is satisfied even when a specific condition among data-transfer-startup promotion conditions that promote determining the data-transfer startup mode as the startup mode is satisfied;
wherein the data-transfer-startup promotion conditions include:

a condition that the electronic device is started up by a first operation; and a condition that a specific-data storage device that is different from the specific-type-data storage device and stores specific data is mounted to the electronic device.

2. The electronic device according to claim 1, wherein the processor determines the data-transfer startup mode as the startup mode when the data-transfer-startup promotion condition that promotes determining the data-transfer startup mode as the startup mode is satisfied.

3. The electronic device according to claim 2, wherein the processor determines the data-transfer startup mode as the startup mode when a specific condition among the data-transfer-startup promotion conditions is satisfied even when a specific condition among the data-transfer-startup obstruction conditions that obstruct determining the data-transfer startup mode as the startup mode is satisfied.

4. An electronic device comprising:
a processor; and
a specific-type data storage device that ensures storing specific type of data;
the processor configured to:
determine a startup mode of the electronic device; and
start up the electronic device in the startup mode determined by the processor; wherein
the startup mode includes
an ordinary startup mode, and
a data-transfer startup mode that transfers the specific type of data to the specific-type-data storage device; and
the data-transfer startup mode is a mode where among the processes executed in the ordinary startup mode, at least a part of the processes unnecessary to transfer the specific type of data to the specific-type-data storage device is unexecuted;
wherein the processor determines the ordinary startup mode as the startup mode when a data-transfer-startup obstruction condition that obstructs determining the data-transfer startup mode as the startup mode is satisfied; wherein the data-transfer-startup promotion conditions include:
a condition that the electronic device is started up by a second operation; and
a condition that the specific-type data is stored in the specific-type-data storage device.

5. The electronic device according to claim 1, wherein:
the data-transfer-startup promotion condition includes a condition that the specific-data storage device is mounted to the electronic device; and when the electronic device is started up in the data-transfer startup mode that is determined as the startup mode by the processor due to satisfaction of a condition that the specific-data storage device is mounted to the electronic device, the processor deletes the specific data from the specific-data storage device after having transferred the specific type of data to the specific-type-data storage device.

6. A non-transitory computer-readable recording medium storing a data-transfer program for controlling an electronic device including a specific-type data storage device that ensures storing specific type of data, the data-transfer program causing the electronic device to:
determine a startup mode of the electronic device; and
start up the electronic device in the startup mode when said determination is made; wherein
the startup mode includes
an ordinary startup mode, and
a data-transfer startup mode that transfers the specific type of data to the specific-type-data storage device; and
the data-transfer startup mode is a mode where among the processes executed in the ordinary startup mode, at least a part of the processes unnecessary to transfer the specific type of data to the specific-type-data storage device is unexecuted;
wherein the electronic device determines the ordinary startup mode as the startup mode when a data-transfer-startup obstruction condition that obstructs determining the data-transfer startup mode as the startup mode is satisfied;
wherein the electronic device determines the ordinary startup mode as the startup mode when a specific condition among the data-transfer-startup obstruction conditions is satisfied even when a specific condition among data-transfer-startup promotion conditions that promote determining the data-transfer startup mode as the startup mode is satisfied;
wherein the data-transfer-startup promotion conditions include:
a condition that the electronic device is started up by a first operation; and
a condition that a specific-data storage device that is different from the specific-type-data storage device and stores specific data is mounted to the electronic device.

* * * * *